1,477,929

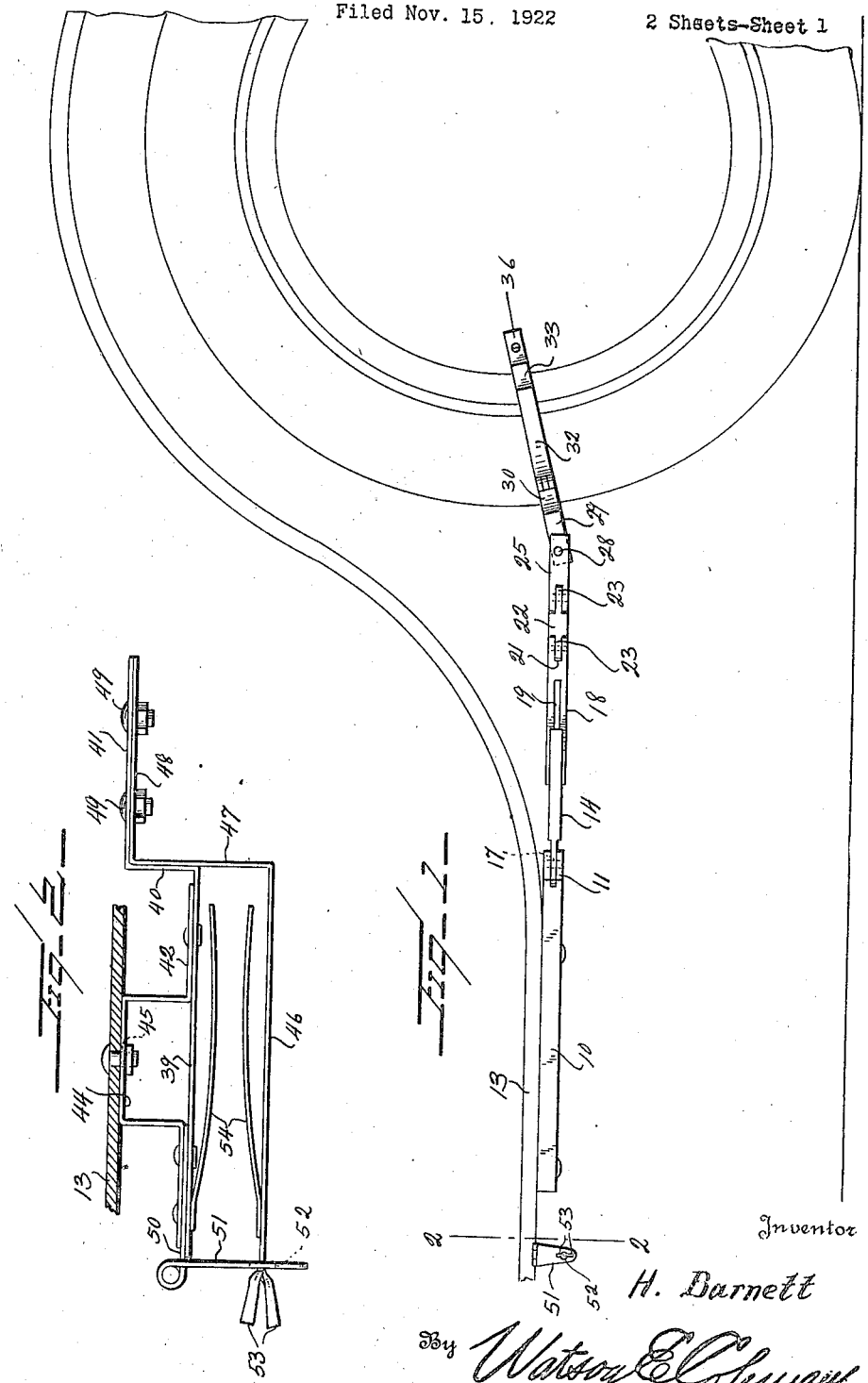

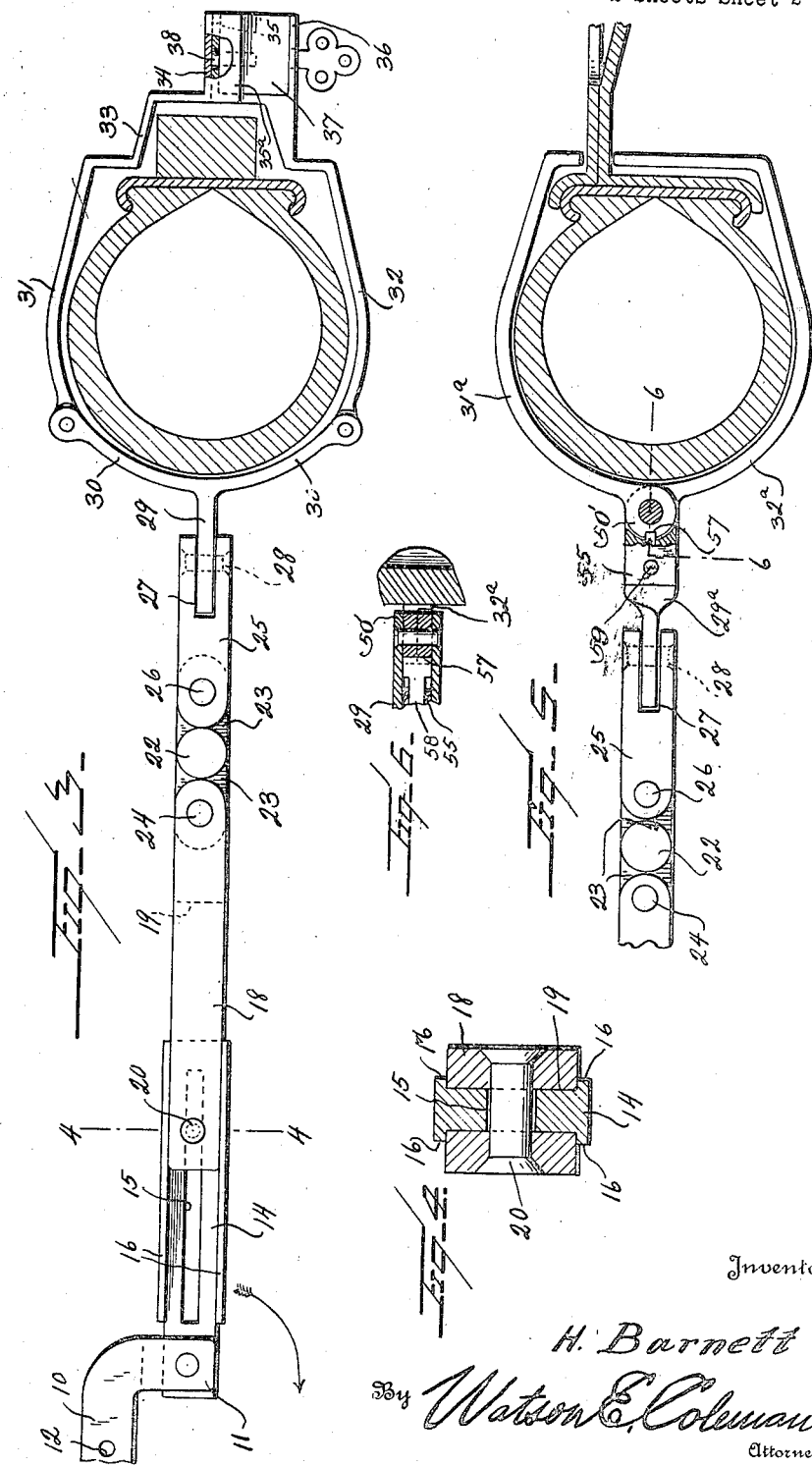
Dec. 18, 1923.  
H. BARNETT  
AUTOMOBILE WHEEL LOCK  
Filed Nov. 15, 1922  
1,477,929  
2 Sheets-Sheet 2
Inventor  
H. Barnett  
By Watson E. Coleman  
Attorney Patented Dec. 18, 1923.

UNITED STATES PATENT OFFICE.

HARRY BARNETT, OF HELENA, MONTANA.

AUTOMOBILE WHEEL LOCK.

Application filed November 15, 1922. Serial No. 601,113.

*To all whom it may concern:*

Be it known that I, HARRY BARNETT, a citizen of the United States, residing at Helena, in the county of Lewis and Clark and State of Montana, have invented certain new and useful Improvements in Automobile Wheel Locks, of which the following is a specification, reference being had to the accompanying drawings.

This invention relates to devices for locking automobiles to prevent the theft or unauthorized use of the automobile, and the general object of the invention is to provide a locking device of this character which is sufficiently difficult of removal as to prevent theft or removal of the car under ordinary circumstances.

A further object is to provide a device of this kind which includes jaws adapted to clasp the wheel at the rim thereof and which is preferably mounted upon the running board of the machine beneath the same, and is adapted to be swung from a concealed, retracted position to a projected position into engagement with the wheel rim.

A still further object is to provide a locking device of this character which, because it is attached to the under side of the running board, is not unsightly and which, when in a locking position, presents a neat appearance and which, when swung back and not in use, will be completely out of sight.

Another object is to provide a device of this character which may be readily adjusted to automobiles of different sizes and makes and which, by a modification, may be used with disk wheels as well as spoked wheels.

Still another object is to provide means attached beneath the running board of the machine whereby the latch may be supported in its inoperative position.

Other objects will appear in the course of the following description.

My invention is illustrated in the accompanying drawings, wherein:—

Figure 1 is a fragmentary side elevation of an automobile showing my improved locking device applied to the running board thereof and engaged with a front wheel thereof;

Figure 2 is a transverse section of the running board showing the means for supporting the locking device when not in use the section being taken on line 2—2 of Figure 1;

Figure 3 is a top plan view of the locking mechanism, the tire and rim being shown in section;

Figure 4 is a section on the line 4—4 of Figure 3;

Figure 5 is a fragmentary top plan view of a modification of the locking mechanism, the tire and disk wheel being shown in section;

Figure 6 is a section on the line 6—6 of Figure 5;

Referring to the drawings, it will be seen that my locking device comprises a supporting bar 10, which bar is preferably square in cross section and of any desired length, and is angularly bent at one end, as at 11, this end being cleft or bifurcated. The bar is provided with a plurality of openings 12 through which rivets, bolt or other attaching devices may pass and engage the running board 13 of the car.

Pivoted within the angularly bent cleft portion 11 of the supporting bar 10 is a longitudinally slotted section 14 having a length under ordinary circumstances of nearly 7″, this bar being longitudinally slotted for the greater portion of its length, as at 15, and provided on each edge of the bar and on both faces thereof with the outwardly projecting flanges 16. One end of the bar has an opening 17 by which the bar 14 is pivoted to the angular end 11 of bar 10. Coacting with this member 14 is a member 18 which is longitudinally slotted, as at 19, so as to embrace the bar 14 and have sliding engagement between the flanges 16. This bar is perforated at one end for the passage of a rivet 20 which passes through the slot 15. Thus this member 18 is slidably mounted upon the member 14 and the members 18 and 14 together turn upon a pivot connecting the member 14 to the angular end 11 of the supporting bar 10.

The outer end of the section 18 is bifurcated, as at 21, and coacting with this end of the member 18 is a knuckle 22 having tangs 23, one of which is insertible within the slot 21 and is pivoted thereto by means of the rivet 24. Coacting with the other tang 23 of member 22 is a section 25 which is bifurcated to receive the tang 23 and which is pivoted thereto by the rivet 26. The outer end of this member 25 is bifurcated, as at 27, and formed with a countersunk opening for the passage of a rivet 28.

Pivotally connected to the section 25 by the rivet 28 is the base portion of a pair of jaws adapted to grasp the tire and rim of the wheel. In Figure 3, I have illustrated this base portion as consisting of a shank 29 insertible within the cleft 27 and pivoted to the member 25 by means of the rivet 28, this shank having the lateral curved prolongations 30 having knuckles at their extremities. Pivoted to these knuckles by means of countersunk rivets are the opposed jaws 31 and 32. Each of these jaws at its outer end is angularly bent, as at 33, to fit the rim of the wheel, while the body of the jaws and portions 31 fit over the tire and then the jaws are extended in parallel relation, as at 34 and 35, these lips 34 and 35 fitting against each other and one of the lips, as for instance the lip 34 being formed with lateral flanges 35$^a$ which embrace the lip 35 and close the joint between the lips so that it makes it impossible to insert a tool between the two lips to force them apart. Preferably, a flange 36 will be formed upon the jaw 32 which extends out beneath the flange or lip 35 and a lock casing 37 will be disposed between the flange or lip 36 and the flange or lip 34 will be provided with a hasp 38 insertible into the lock casing and engaged by a suitable bolt therein. Preferably a Yale lock or a lock of similar character will be used, and inasmuch as locks of this character are old and well known, I have not attempted to illustrate the interior construction of the lock but only the exterior view thereof, it being understood that the bolt of this lock will engage the hasp 38.

All of these parts will preferably be made of manganese steel and the parts will be riveted to each other by rivets whose heads are countersunk in the parts so as to make it practically impossible to disjoint the parts without a considerable amount of work. It will be seen that the several sections are pivoted to each other so that the parts may be folded back beneath the running board of the automobile or swung out in position for the jaws to engage the wheel. Thus the parts will swing upon the rivet connecting the section 10 with the section 14 and also upon the knuckle 22. The shank 29 is pivoted to the section 25 so that it swings at right angles to the plane of rotation of the section 25 on the knuckle 22.

For the purpose of holding the wheel lock securely beneath the running board of the machine, I provide the construction illustrated in detail in Figure 2, which comprises a longitudinally extending metal strip 39 bent upward adjacent one end, as at 40, and then longitudinally extended, as at 41. Riveted to the upper face of this strip is a second metallic strip 42, the middle portion of which is upwardly bent, as at 44, the same height as the angular bend 40. The middle of this strip is formed with an aperture 45 whereby it may be attached by a bolt, rivet or other like fastening device to the running board of the automobile.

Disposed below the strip 39 and extending parallel thereto is a metal strip 46 angularly bent, as at 47, so as to extend upward and lie flat against the portion 40 of the strip 39 and then again angularly bent longitudinally to lie against the portion 41, as at 48. This part 48 and the part 41 are perforated for the passage of bolts 49 holding these two parts together. Disposed between one end of the strip 39 and one end of the strip 42 remote from the bend 47 is one leaf 50 of a hinge, the other leaf 51 of this hinge normally depending so as to intersect the strip 46, this leaf 51 having an aperture 52. The extremity of the strip 46 is split or otherwise formed to provide two tongues 53 whose resiliency tends to spread them apart from each other. When these tongues are compressed, however, by the fingers they may be inserted through the aperture 52 and will then expand, thus holding the hasp or leaf 51 in its depending position and closing the end of the space between the strips 39 and 46. By compressing these tongues 53, the spring leaf 51 may be shifted and raised so as to open the space between the strips 39 and 46. The part 46 is made of resilient material, and preferably springs 54 will be disposed upon the inner faces of the strips 39 and 46 so that the locking device may be swung in between the strips 39 and 46 and will be held firmly engaged therein when the strip 46 has its free end compressed toward the leaf 50 and inserted through the opening 52 of the leaf 51.

This device will hold the locking mechanism entirely concealed beneath the running board and the resiliency of the springs 54 and the fact that they clasp the locking device resiliently will prevent any rattling of the parts.

I have heretofore described a rim and tire embracing member formed to fit a spoked wheel such as ordinarily found on automobiles, but it obvious that the embracing member may be modified so as to engage with and lock upon the rim and tire of a spokeless or disk wheel. In this case, as illustrated in Figure 5, the jaws 31$^a$ and 32$^a$ have knuckles which overlap each other and which are pivotally engaged with a shank 29$^a$. A lock casing 55 is mounted upon the shank 29$^a$ and has a bolt adapted to engage the knuckles 50', the knuckles being slotted at 57 for engagement by this bolt 58 so that when the bolt 58 is projected into the slot 57 by a key inserted into the key slot 59, the jaws 31$^a$ and 32$^a$ ar held from being opened. It will be seen that these jaws are so formed that they meet the faces of the disk and inasmuch as the jaws cannot be opened it is obvious that the locking device cannot be removed from its engagement with the disk wheel until the jaws are unlocked.

It will be seen that the slotted members 14 and 18 may be slidably adjusted or shifted upon each other so that the support for the jaws is adjustable to different distances between the wheel and the point of attachment of the member 10 on the car and that the joint between the shank 28 and the member 25 permits the jaws to be turned back away from the wheel or to be disposed at an angle to the horizontal if desired. After the jaws have been opened, the jaws and the parts 19, 22 and 25 may be slid back upon the part 14 so as to entirely disengage the jaws from the tire and rim and then these parts 18, 22, 25 and 14 may be swung upon the pivot bolt connecting them to the angular portion 11 until the parts are disposed entirely beneath the running board and engaged with the holding device heretofore described.

This device is intended to be attached to the running board and used with the right front wheel or the left rear wheel. I have illustrated the device as being used in connection with the right front wheel. All parts of the lock will be of manganese steel, thus preventing the use of a saw or bolt cutters. All bolts will be rivet bolts with countersunk heads so as to offer no opportunity for the use of a cold chisel in cutting off bolt heads. The lock used to fasten the jaws in clamped position upon the rim and tire will be so designed that no weak part will be exposed. The supporting member 10 will be made of various lengths, widths and thicknesses, depending upon the make and character of the machine and the degree of strength required.

Inasmuch as this device is fastened to the running board it must be removed from the rim and tire before the car can be moved. It is conveniently located on the car so that it can be swung into place for use and adjusted with a minimum effort and can likewise be quickly and easily disconnected and restored to its place under the running board. The slots 15 and 19 and the parts 14 and 18 permit the total length of the device to be shortened or lengthened to meet the position of the front wheel so that it can be locked together upon the front wheel whether the front wheels are parallel to the axis of the car or cramped. The pivotal connection between the several sections and the sliding engagement between the sections 14 and 18 give the entire device flexibility, which makes it particularly convenient to use.

In removing the lock from engagement with the wheel, that is from a position of use as illustrated in Figure 1, the lock holding the jaws 31 and 32 is released, both jaws are opened, and the shank 29 then allowed to drop to a vertical position, turning on the pivot 28. The entire working part of the device is then swung outward upon the pivot 17 and when the device is clear of the wheel the shank 29 is again raised to a horizontal position in line with the portions 14, 18, 22 and 25. The jaws are brought together and the device is swung on the pivot 17 to a position of rest under the running board.

In shifting the device from a position of rest to a position of use, the entire device is swung outward upon the pivot 17, the shank 29 is dropped to a vertical position so as to clear the wheel until the jaws are in position underneath the wheel. The jaws are, of course, opened and then the shank and jaws are swung upward and the jaws brought into place around the wheel.

I claim:—

1. Means for locking automobile wheels comprising a supporting member adapted to be attached beneath the running board of the machine, a wheel rim and tire embracing member including pivoted jaws, and means for locking them clamped upon a tire and wheel rim, and a plurality of pivoted sections, one of said sections being pivoted to the supporting member and the section at the opposite end being pivoted to the jaws, two of said sections overlapping each other and having sliding engagement with each other.

2. Means for locking an automobile wheel comprising a supporting member adapted to be attached beneath the running board of the machine, a section pivoted thereto, a section having sliding engagement with the first named section, a knuckle pivoted to the end of said sliding section, a section pivoted to the outer end of the knuckle, all of said members swinging in the same plane, a pair of jaws pivoted to the last named section for movement in a plane at right angles to the plane of swinging movement of said sections, said jaws being formed to embrace a tire and wheel rim, and means for locking the jaws.

3. An automobile wheel locking device comprising a shank and a pair of jaws pivoted thereto and adapted to engage around and grip a tire and wheel rim, means for locking said jaws in a gripping position, a supporting member adapted to be attached beneath the running board of an automobile, a plurality of sections pivoted to each other, the end sections being pivoted to the shank and to said supporting member respectively, two of said sections having overlapping sliding engagement and one of said sliding sections having flanges extending over the edges of the other sliding section.

4. In an automobile having a wheel and a running board, a supporting member attached beneath the running board, a series of sections jointed to each other and to the supporting member, a pair of jaws pivoted to the outer ends of said sections and to each other, means for locking said jaws closed around the wheel rim and tire, the pivoted sections permitting the jaws to be turned back beneath the running board, and means for holding the jaws beneath the running board comprising a pair of members extending transversely of the running board, one of said members being yieldably movable away from the other member, and a hasp locking said members in parallel relation and normally closing the space between the members.

5. In an automobile having a wheel and a running board, a supporting member attached beneath the running board, a series of sections jointed to each other and to the supporting member, a pair of jaws pivoted to the outer ends of said sections and to each other, means for locking said jaws closed around the wheel rim and tire, the pivoted sections permitting the jaws to be turned back beneath the running board, means for holding the jaws beneath the running board comprising a pair of members extending transversely of the running board, one of said members being yieldably movable away from the other member, and a hasp locking said members in parallel relation and normally closing the space between the members, the resilient member having its extremity split to form a resilient tongue and the hasp having an opening through which said tongue may be inserted.

In testimony whereof I hereunto affix my signature.

HARRY BARNETT.